United States Patent
Tanis-Likkel et al.

(10) Patent No.: US 8,648,291 B2
(45) Date of Patent: *Feb. 11, 2014

(54) PROJECTION SYSTEM HAVING A VIRTUAL MASK AND A PROJECTION AREA WITH A SHAPE DEFINED BY SURROUNDING GRAPHICS

(71) Applicant: 3M Innovative Properties Company, St. Paul, MN (US)

(72) Inventors: Brett C. Tanis-Likkel, Bainbridge Island, WA (US); Vincent S. Peddle, Bremerton, WA (US); Mark L. Schuleman, Mendota Heights, MN (US); Michael L. Graetz, Stillwater, MN (US); Russell J. Vander Wiel, Maplewood, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/763,213

(22) Filed: Feb. 8, 2013

(65) Prior Publication Data

US 2013/0148087 A1    Jun. 13, 2013

Related U.S. Application Data

(63) Continuation of application No. 13/487,644, filed on Jun. 4, 2012, now Pat. No. 8,461,506, which is a continuation of application No. 12/961,024, filed on Dec. 6, 2010, now Pat. No. 8,193,480, which is a continuation of application No. 12/133,512, filed on Jun. 5, 2008, now Pat. No. 7,923,675.

(60) Provisional application No. 60/942,363, filed on Jun. 6, 2007.

(51) Int. Cl.
*H01L 27/00* (2006.01)

(52) U.S. Cl.
USPC .......................................... 250/208.1; 353/75

(58) Field of Classification Search
USPC .................. 250/208.1, 237 R, 239, 216, 226; 353/30, 75, 97; 348/203, 397.1, 398.1, 348/745, 746; 345/422–427; 359/443, 452

See application file for complete search history.

(56) References Cited

U.S. PATENT DOCUMENTS 3,691,140 A  9/1972  Silver
3,712,707 A  1/1973  Henkes, Jr.

(Continued)

FOREIGN PATENT DOCUMENTS

EP    0 570 515    11/1993
EP    0 736 585    10/1996

(Continued)

OTHER PUBLICATIONS

Satas, "Pressure Sensitive Adhesives and Adhesive Products in the United States," *Handbook of Pressure Sensitive Adhesives*, 2$^{nd}$ Ed., Von Reinhold Nostrand, pp. 1-37 (1989).

(Continued)

*Primary Examiner* — Que T Le
(74) *Attorney, Agent, or Firm* — Steven A. Bern

(57) ABSTRACT

A projection system includes a projection screen defining a shape and a projector configured to project an image onto the projection screen. The projector may project a static or dynamic image that has substantially the same shape as the projection screen or otherwise block portions of the projected image that are projected outside of the projection screen with the aid of a virtual mask. The virtual mask and the projection screen may be created based on a virtual shape template that defines the desired shape for the projection screen, such as with a vector outline. In some embodiments, the virtual mask and the projection screen are created based on the same virtual shape template. The virtual shape template may define a cutting path for extracting the projection screen from a suitable material.

8 Claims, 8 Drawing Sheets

(56) References Cited

U.S. PATENT DOCUMENTS

| | | | |
|---|---|---|---|
| 3,872,032 A | 3/1975 | Kanemaru et al. |
| 4,166,152 A | 8/1979 | Baker et al. |
| 4,379,617 A | 4/1983 | Funakoshi et al. |
| 4,418,986 A | 12/1983 | Yata et al. |
| 4,468,092 A | 8/1984 | Inoue et al. |
| 4,509,823 A | 4/1985 | Moriguchi et al. |
| 4,576,850 A | 3/1986 | Martens |
| 4,968,562 A | 11/1990 | Delgado |
| 4,994,322 A | 2/1991 | Delgado et al. |
| 5,141,790 A | 8/1992 | Calhoun et al. |
| 5,183,597 A | 2/1993 | Lu |
| 5,196,266 A | 3/1993 | Lu et al. |
| 5,296,277 A | 3/1994 | Wilson et al. |
| 5,362,516 A | 11/1994 | Wilson et al. |
| 5,406,415 A | 4/1995 | Kelly |
| 5,650,215 A | 7/1997 | Mazurek et al. |
| 5,754,182 A | 5/1998 | Kobayashi |
| 5,795,636 A | 8/1998 | Keller et al. |
| 6,015,606 A | 1/2000 | Abe |
| 6,123,890 A | 9/2000 | Mazurek et al. |
| 6,197,397 B1 | 3/2001 | Sher et al. |
| 6,204,971 B1 | 3/2001 | Morris et al. |
| 6,288,172 B1 | 9/2001 | Goetz et al. |
| 6,344,263 B1 | 2/2002 | Moshrefzadeh et al. |
| 6,466,368 B1 | 10/2002 | Piepel et al. |
| 6,519,087 B2 | 2/2003 | Moshrefzadeh |
| 6,524,675 B1 | 2/2003 | Mikami et al. |
| 6,535,333 B1 | 3/2003 | Piepel et al. |
| 6,631,030 B2 | 10/2003 | Stevenson et al. |
| 6,692,647 B2 | 2/2004 | Moshrefzadeh et al. |
| 6,803,072 B2 | 10/2004 | Sher et al. |
| 6,870,670 B2 | 3/2005 | Gehring et al. |
| 7,097,307 B2 | 8/2006 | Lawrence |
| 2008/0304018 A1 | 12/2008 | Tanis-Likkel |

FOREIGN PATENT DOCUMENTS

| | | |
|---|---|---|
| WO | WO 92/13924 | 8/1992 |
| WO | WO 94/21742 | 9/1994 |
| WO | WO 97/01610 | 1/1997 |
| WO | WO 98/45753 | 10/1998 |
| WO | WO 99/50710 | 10/1999 |
| WO | WO 00/22059 | 4/2000 |
| WO | WO 00/56556 | 9/2000 |
| WO | WO 00/69985 | 11/2000 |

OTHER PUBLICATIONS

Sobieski et al., "Silicone Pressure Sensitive Adhesives," *Handbook of Pressure Sensitive Adhesives*, 2$^{nd}$ Ed., Von Reinhold Nostrand, pp. 508-517 (1989).

PROJECTION SYSTEM HAVING A VIRTUAL MASK AND A PROJECTION AREA WITH A SHAPE DEFINED BY SURROUNDING GRAPHICS

TECHNICAL FIELD

The invention relates to optical systems, and more particularly, optical systems including a projection screen and a projector.

BACKGROUND

Projection display systems typically include an image source, such as a projector, and a projection screen. During operation of the projection display system, the projector typically projects an image onto the projection screen for presentation to viewers. The projection screen may provide a diffuse surface to improve the image quality seen by viewers. A rear projection system may include an image source, optics to enlarge and direct the image light, and a projection screen to receive the image light from one side and transmit the images for viewing from the opposite side of the rear projection screen. A rear projection screen may be a sheet-like optical device with a relatively thin viewing layer that is placed at an image surface of the projector.

Projection systems may be used for advertising in malls, showrooms, and exhibitions. Rear projection systems are one such example. A rear projection system includes at least a projection device (e.g. a three-color liquid crystal display projector that combines polarized light from different liquid crystal displays and emits combined light to form images) and a rear projection screen. The projector is configured to project an image within a limited projection area, which is typically a basic shape, such as a square or rectangle.

SUMMARY

In general, the invention is directed toward a projection system that includes a projection screen defining a shape and a projector that projects an image onto the projection screen with the aid of a virtual mask that defines a main image area that substantially matches the shape of the projection screen. The projector may project a static or dynamic image that has substantially the same shape as the projection screen or otherwise match the projected image to the shape of the projection screen with the aid of a virtual mask.

The mask is a virtual mask, such as a digital mask, that does not physically exist. The virtual mask substantially blocks portions of an image that are projected outside of the projection screen. In one embodiment, the virtual mask defines a main image area that defines a shape substantially corresponding to the shape of the projection screen, and a region outside of the main image area is filled with light limiting content, such as a uniform black color or printed graphics. For example, the mask may fill the region of the projection area outside of the main image area with a light absorbing color (e.g., black), such that the projector projects black outside of the projection screen. An image file (e.g., a video file) that incorporates the virtual mask may be inputted into the projector for projecting onto the projection screen. In one embodiment, the virtual mask is incorporated as a layer of the image projected by the projection screen.

The virtual mask and the projection screen may be created based on a virtual shape template that defines the desired shape for the projection screen. In some embodiments, the virtual mask and the projection screen are created based on the same virtual shape template. That is, in some embodiments, a common virtual shape template defines the desired shape for the projection screen and the desired shape for the main image area of the mask. In some embodiments, the virtual shape template includes a vector outline that defines the desired shape. A virtual shape template comprising a vector outline or another type of vector-based graphic may be useful because vector-based graphics may be scaled to any suitable size without substantial degradation of resolution.

The projection screen may be manually cut or automatically cut into the desired shape with the aid of a computer-controlled cutting machine. In either case, the virtual shape template defines a cutting path for extracting the projection screen from a suitable material, such as an optical film. In one embodiment, the cutting path is defined by a vector outline and the cutting path is substantially continuous, thereby minimizing jagged edges.

In one embodiment, the invention is directed to a method comprising creating a virtual shape template defining a shape, creating a virtual mask for a projector based on the virtual shape template, and creating a projection screen substantially defining the shape based on the virtual shape template.

In another embodiment, the invention is directed to a system comprising a virtual mask comprising a main image area defining a shape, a projection screen substantially defining the shape, and a projector configured to project an image onto the projection screen. The virtual mask substantially blocks portions of the image outside of the main image area when the virtual mask is superimposed on the image.

In another embodiment, the invention is directed to a system comprising means for creating a virtual shape template defining a shape, means for creating a virtual mask for a projector based on the virtual shape template, and means for creating a projection screen substantially defining the shape based on the virtual shape template.

In one embodiment, the invention is directed to a method comprising creating a first virtual shape template defining a shape, creating a virtual mask for a projector based on the first virtual shape template, creating a second virtual shape template substantially defining the shape, and creating a projection screen substantially defining the shape based on the second virtual shape template.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
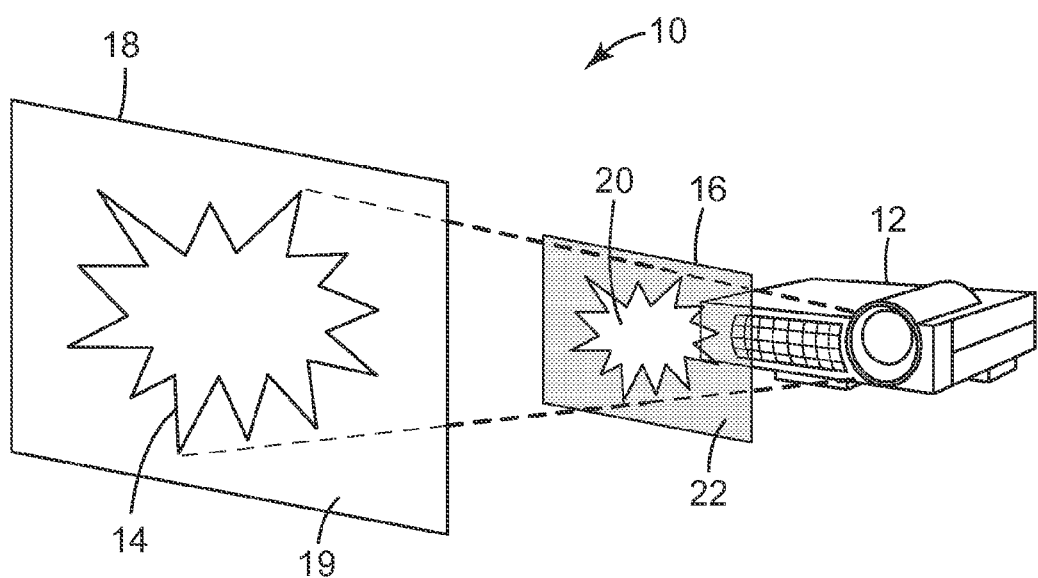
FIG. 1 is a schematic diagram illustrating a projection system including a projection screen defining a shape and a projector configured to project an image onto the projection screen with the aid of a virtual mask.

FIG. 1 is a schematic diagram illustrating projection system 10, which includes projector 12, projection screen 14, and virtual mask 16. Projector 12 may be any suitable device configured to project an image onto projection screen 14, such as, but not limited to, a liquid crystal display (LCD) projector, a digital light projection (DLP) projector, a liquid crystal on silicon (LCOS) projector or a plasma projector. Projector 12 is configured to receive an input, such as a video signal from an inputted video file, and project the corresponding image onto projection screen 14. Projector 12 may have any suitable display resolution, such as, but not limited to, display resolutions in accordance with the Super Video Graphics Array (SVGA) display standard (800×600 pixels), the eXtended Graphics Array (XGA) display standard (1024×768 pixels), the 720p display standard (1280×720 pixels) or the 1080p display standard (1920×1080 pixels).

Specific examples of suitable projectors 12 include Digital Light Processing Projectors available from Texas Instruments DLP Technologies of Dallas, Tex., Barco Projection Systems of Belgium, Seiko Epson Corporation of Tokyo, Japan, Hitachi, Ltd. of Tokyo, Japan, JVC Victor Co. of Yokohama, Japan, Eastman Kodak Company of Rochester, N.Y., NEC Corporation of Tokyo, Japan, Panasonic Communications Co. of Fukuoka, Japan, Koninklijke Philips Electronics, N.V. of Eindhoven, Netherlands, Polaroid Corporation of Waltham, Mass., Sanyo Electric Co., Ltd. of Osaka, Japan, Sharp Kabushiki Kaisha of Osaka, Japan, Sony Corporation of Tokyo, Japan, and Kabushiki Kaisha Toshiba of Tokyo, Japan. Specific model numbers include a Barco 6000 Series video projector, a Panasonic PT-D 9500 DLP-projector (capable of providing 10,000 ANSI lumens), and a Toshiba LCD Data Projector, number TLP 710. It is also contemplated that an overhead projector may be used in some aspects of the invention.

Projection screen 14 may be any suitable projection screen that may be cut to define a particular shape prior to installation on a display surface, such as a window, door, or wall. The relative dimensions of the different sides of projection screen 14 (e.g., an overall height and an overall width) may be selected based on the aspect ratio of projector 12, as well as the pixel count of projector 12.

While it is useful to cut a projection screen during or before installation to customize the projection screen for use with a particular shape of a window, such as a square, rectangular or circular window, projection screens having more unique shapes may also be useful. For example, a projection screen cut into a shape resembling a trademarked shape, such as a beverage bottle, may be more eye-catching than a rectangular shaped screen. A unique shape may add to the appeal of projection screen 14 as well as the ability to captivate viewers. Other non-limiting examples of shapes of projection screen 14 include silhouettes of characters, alphabetic letters, geometric patterns, logos, marquees, geometric shapes, thought bubbles, human figures, animal outlines, and product outlines.

As described in further detail below, a vector outline defined by a vector-based graphics software program may be used to define the outer boundaries of projection screen 14 in order to extract (e.g., cut) screen 14 from a sheet of optical film or otherwise create screen 14 defining a customized shape. Any suitable software program executing on a computing device may be used to create the vector outline for defining the desired shape. Examples of suitable software programs include Adobe Photoshop, Adobe Flash, Adobe FreeHand, and Adobe Illustrator, which are each available from Adobe Systems Incorporated of San Jose, Calif. Further examples of suitable software programs for creating a vector image include CorelDRAW available from Corel Corporation of Ottawa, Canada and ConceptDraw available from Computer Systems Odessa of Odessa, Ukraine.

Vector images typically define a shape in computer graphics by geometrical primitives, such as lines, curves, points, polygons, and so forth. Vector images may provide certain advantages over raster-based images, such as an ability to be scaled without a loss of clarity. That is, a vector image may be scaled to substantially any size, large or small, without losing the clarity of the curves or other geometrical primitives defining the image. Thus, a vector image defining a shape for projection screen 14 may be scaled to any size without losing the clarity of the outer boundaries of projection screen 14. In contrast, raster images, which define a shape via a plurality of pixels, degrade in clarity upon scaling. Vector images may also be referred to as vector graphics, geometric modeling or object-oriented graphics.

Figure 10:
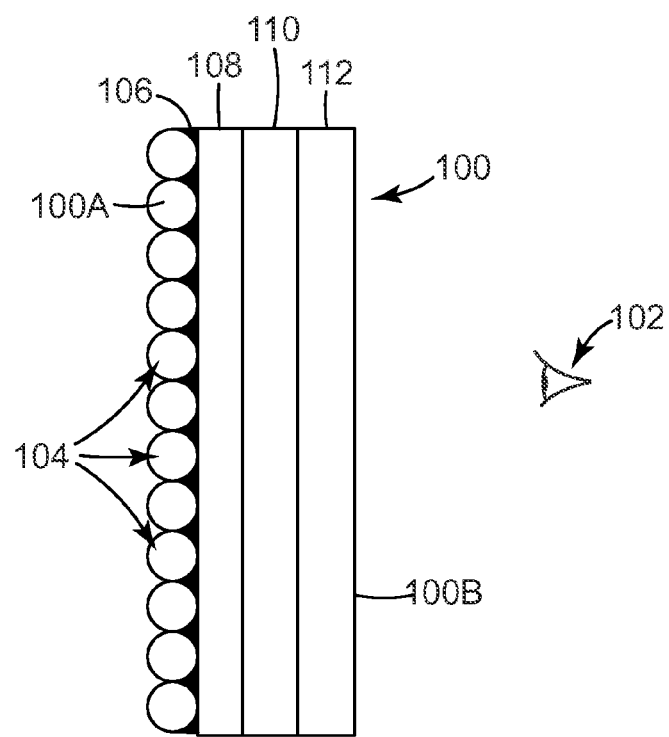
FIG. 10 is a schematic side view of an embodiment of a projection screen that may be used in a projection system of the present invention.

In one embodiment, projection screen 14 is a substantially flexible projection screen. For example, projection screen 14 may be a flexible screen including refractive elements, such as glass beads, and a light absorbing layer for rendering projection screen 14 substantially opaque in ambient lit conditions when no image is projected on projection screen 14 by projector 12, as shown in FIG. 10 and described below. An example of such a projections screen is also described in further detail in U.S. Pat. No. 6,870,670, entitled, "SCREENS AND METHODS FOR DISPLAYING INFORMATION," which issued on Mar. 22, 2005 and is incorporated herein by reference in its entirety. As another example, projection screen 14 may be an optical screen available from 3M Company of St. Paul, Minn. under the Vikuiti trade name. In some embodiments, projection screen 14 is a rear projection screen in which projector 12 projects an image onto a rear of projection screen 14 and the image is viewable from a front surface of projection screen 14, which is substantially opposite the rear surface. In other embodiments, projection screen 14 is a front projection screen, in which projector 12 projects an image onto the same surface as the viewing surface of projection screen 14.

The flexible characteristic of screen 14 may allow screen 14 to be manipulated to define a smaller "foot print" (i.e., a more compact size) as compared to an unrolled screen 14 for relatively easy storage and transportation. Screen 14 is shown in an unrolled state in FIG. 1. In one embodiment, screen 14 may be rolled in a cylindrical fashion without damaging screen 14. "Cylindrical fashion" may include, for example, a manner in which maps, posters or diplomas are commonly rolled. However, in some cases, the particular shape of screen 14 may limit the extent to which screen 14 may be rolled.

In general, a thinner screen 14 may be easier to cut into a customized shape than a thicker screen. Accordingly, in some embodiments, screen 14 has a thickness less than or equal to about 1 millimeter (mm).

Projector 12 is configured to project an image within projection area 18, which encompasses projection screen 14 when projector 12 is properly positioned relative to projection screen 14. Projection area 16 may have any suitable customized or standard aspect ratio, such as, but not limited to 16:9 or 4:3. Because projection screen 14 defines a specialized shape, it may be desirable for projector 12 to direct the image onto projection screen 14. In the case of at least rear projection screens, limiting the projected image to the boundaries of projection screen 14, rather than within the entire projection area 18, may help decrease the possibility of shining unwanted light from projector 12 into the eyes of viewers. In addition, it is desirable to minimize the possibility of projecting all or part of an image beyond the outer boundaries of projection screen 14. Portions of an image projected beyond the outer boundaries of projection screen 14 may not be visible, depending on the type of surface to which projection screen 14 is applied.

Virtual mask 16 does not physically exist, but rather, virtual mask 16 is simulated or otherwise created by a computing device. Virtual mask 16 helps define the "field of view" of projector 12 and confines an image projected by projector 12 to projection screen 14. In particular, virtual mask 16 covers portions of projection area 18 of projector 12 that do not fall within the shape defined by projection screen 14. That is, virtual mask 16 substantially blocks or minimizes overflow light that is projected outside of screen 14. In some embodiments, the image file defining the mask 16 is incorporated into the image file including the main content to be projected by projector 12. For example, in one embodiment, virtual mask 16 may be digitally superimposed with the image projected by projector 16 in order to limit the content projected by projector 12 to projection screen 14. "Content" generally refers to an image, whether static or dynamic, that is projected onto projection screen 14.

In one embodiment, virtual mask 16 defines a main image area 20 for the image projected by projector 12 projects that substantially matches the shape of projection screen 14. Virtual mask 16 may fill region 22, which corresponds to region 19 of projection area 18 outside of the outer boundaries of projection screen 14, with light limiting content, such that projector 12 projects limits the light that is projected outside of the shape of projection screen 14. The light limiting content may include a single color, such as a substantially uniform black color, or it could include graphics, characters, or other coloring that helps limit the brightness of the light shined outside of the outer perimeter of projection screen 14.

Main image area 20 of virtual mask 16 may be based on a virtual shape template that defines the shape of main image area 20. In some embodiments, the same virtual shape template is used to define projection screen 14 and main image area 20 of virtual mask 16. As described in further detail below, in some embodiments, the virtual shape template includes a vector outline that defines the shape of main image area 20 and projection screen 14. If different virtual shape templates are used to create virtual mask 16 and projection screen 14, both virtual shape templates should define substantially the same shape such that virtual mask 16 defines a main image area 20 that substantially matches the shape of projection screen 14. A software program executing on a computing device may be used to create the virtual shape template. If necessary, the virtual shape template is scaled to create the desired size of mask 16 and projection screen 14.

Figure 2:
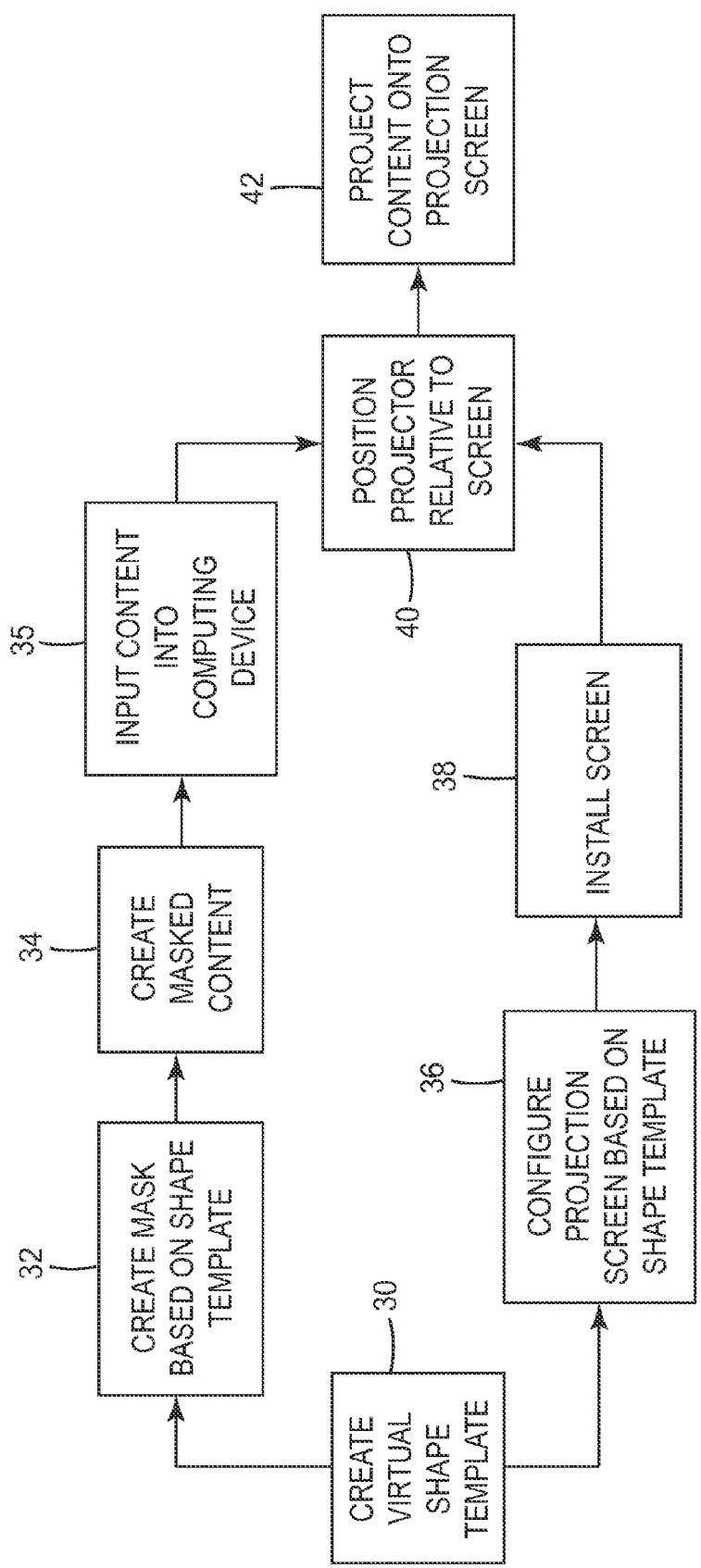
FIG. 2 is a flow diagram illustrating an embodiment of a technique for generating the projection screen and virtual mask of the projection system of FIG. 1.

FIG. 2 is a flow diagram illustrating an embodiment of a technique for creating projection screen 14 and virtual mask 16 of projection system 10 of FIG. 1. A user may create a virtual shape template that defines the desired shape of projection screen 14 (30). In one embodiment, the virtual shape template is a vector graphics file that defines a vector outline of the shape. The vector outline may be created with any suitable vector based graphics application. A "user" is referenced herein to generally refer to any person or automated computing device that may perform any one or more parts of the technique shown in FIG. 2, and reference to a "user" is not intended to limit the present invention in any way.

Figure 3A:
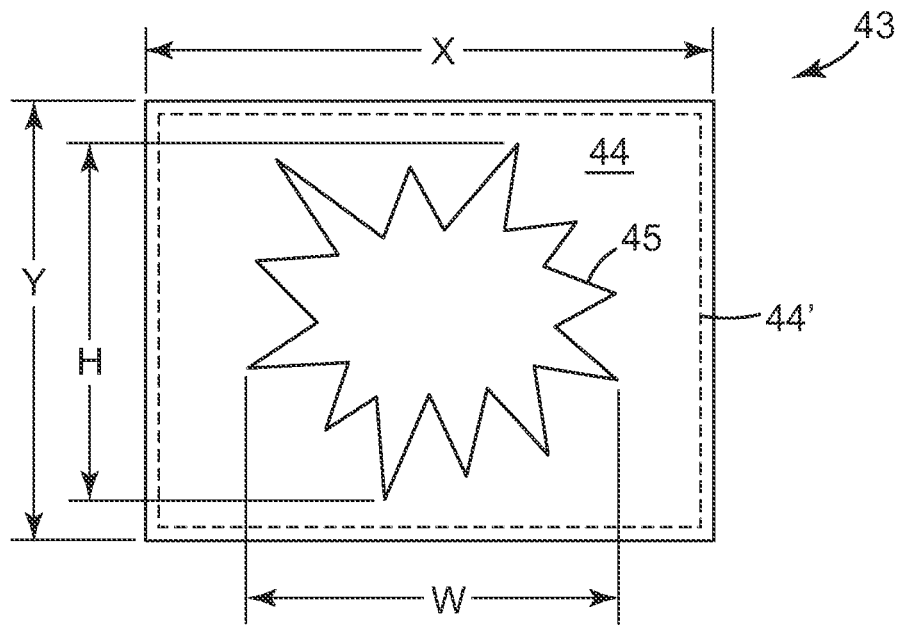
FIG. 3A is a schematic diagram of an embodiment of a virtual shape template.

FIG. 3A illustrates a schematic diagram of virtual shape template 43, which includes workspace 44 and vector outline 45. Vector outline 45 defines the outer boundaries of projections screen 14 and main image area 20 (FIG. 1) of mask 16. In one embodiment, the outer boundary of workspace 44 also defines the outer boundaries of mask 16. When shape template 43 is scaled to a size that corresponds to projection area 18, the total area of workspace 44 substantially corresponds to or exceeds the total projection area 18 of projection screen 14. In addition, the dimensions of workspace 44 substantially correspond to the dimensions of projection area 18 when workspace 44 is scaled to the size of projection area 18. In some embodiments, it may be desirable to create vector outline 45 within a subarea 44' of workspace 44 in order to ensure that the vector outline 45 remains within workspace 44. Creating vector outline 45 within subarea 44' may help ensure that projection screen 14 that is shaped based on vector outline 45 remains within a total projection area 18 of projector 12.

When creating virtual shape template 43, the aspect ratio and the resolution of projector 12 (i.e., the pixel count) may be considered. For example, if projector 12 has an aspect ratio of about X:Y, as shown in FIG. 3A, a hypothetical or digital workspace 44 that has an aspect ratio of X:Y may provide guidelines as to what projection screen 14 shapes may be used with the particular projector 12. While the entire workspace 44 does not need to be occupied by vector outline 45, and thus, the shape does not necessarily need to abide by the X:Y aspect ratio, workspace 44 provides general guidelines for shape template 43. In some embodiments, virtual shape template 43 is configured such that the overall dimensions of vector outline 45 (i.e., the greatest height H and width W of vector outline 45) maintain the aspect ratio of projector 12, which may be useful when scaling virtual shape template 43 to a larger or smaller size.

The user may create vector outline 45 within workspace 44 in order to ensure that the vector outline 45 is compatible with the X:Y aspect ratio. Neither workspace 44 nor vector outline 45 are scaled to the actual size of the desired projection screen 14. Rather, as described in further detail below, shape template 43 and vector outline 45 may be scaled up or down as desired in order to define a cutting path for creating projection screen 14, and vector outline 45 may be scaled up or down as desired in order to define a mask 16 that substantially blocks portions of projection area 18 of projector 12 that are not occupied by screen 14.

Figure 3B:
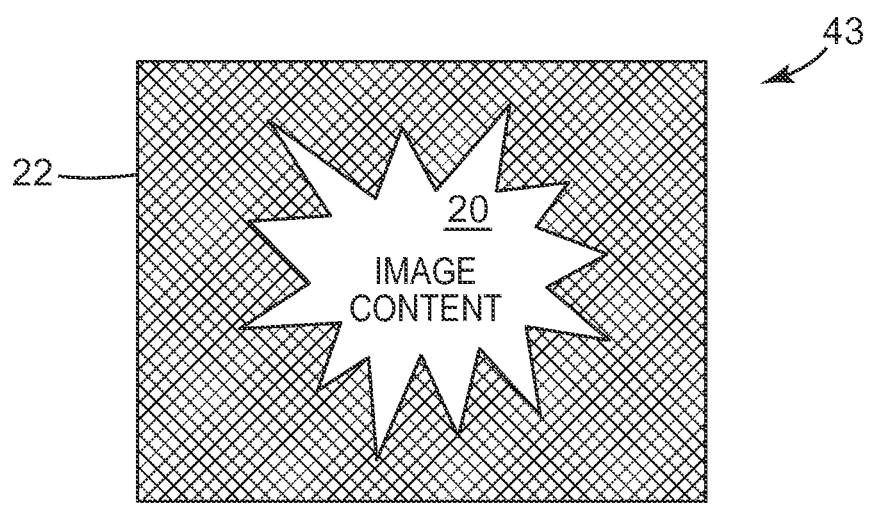
FIG. 3B is a schematic diagram of an embodiment of a virtual mask that may be created based on the virtual shape template shown in FIG. 3A.

Returning now to the flow diagram shown in FIG. 2, virtual mask 16 is created based on the virtual shape template (32), such as with the aid of a computing device. For example, virtual shape template 43 may be used to define the border between main image area 20 of mask 16 and region 22 outside of main image area 20. Virtual mask 16 created from virtual shape template 43 is shown in FIG. 3B. As FIGS. 3A and 3B illustrates, virtual mask 16 is substantially similar to virtual shape template 43. If desired, region 22 outside of main image area 20 may be filled in with a light absorbing color, graphics, characters, or other light limiting content that helps limit the brightness of the light shined outside of the outer perimeter of projection screen 14. In FIG. 3B, region 22 is substantially uniformly filled with a black color.

In one embodiment, virtual mask 16 is based on virtual shape template 43, which is converted from a vector graphics file to a digital image that is based on raster graphics (i.e., pixel-based graphics). In such an embodiment, after virtual shape template 43 is created on a computing device, the vector graphics file may be saved as an encapsulated postscript (EPS) document. Adobe Photoshop, available from Adobe Systems Incorporated of San Jose, Calif., is one example software program that may be used to create the content projected by projector 12. The Adobe Photoshop software program, executing on a computing device, may convert the vector based virtual shape template 43 into a raster based (i.e., pixel-based) virtual mask 16. In one embodiment, the EPS file is opened in Adobe Photoshop software program. In Adobe Photoshop, a rasterizing dialog box appears upon opening the EPS document containing the virtual mask. The rasterizing box enables the user to select the pixel resolution. For example, the user may input a pixel resolution of 1024 pixels (wide)×768 pixels (height). The rasterizing box also provides an option for the user to select a target resolution of pixels per inch. For example, the user may select a target resolution of about 72 pixels per inch. The EPS document is then opened to the indicated size. Some anti-aliasing and translucence of region 22 may occur during and/or after virtual mask 16 is converted to a raster format. The user may adjust the color of region 22 as necessary. In other embodiments, other techniques for creating virtual mask 16 may be employed and the aforementioned example is provided merely to illustrate one example.

Returning to FIG. 2, the content that projector 12 projects outside of screen 14 is covered by virtual mask 16 (34). This content that is directed onto screen 14 is shown as "Image Content" in FIG. 3B and is shown to be substantially disposed within the borders of main image area 20 of mask 16. The content is typically generated using any suitable software program. Virtual mask 16 defines the main image area 20 of the content, and substantially blocks out any portions of the image projected by projector 12 that is projected outside of main image area 20 with the blackened or otherwise blocked region 22 outside of the main image area 20. Main image area 20 has substantially the same shape as projection screen 14. The data that determines the outer boundaries of main image area 20 and, in some cases, the outer boundaries of mask 16 may incorporated with the content file. In one embodiment, virtual mask 16 may be superimposed over the images produced by a video file or another graphics file in order to create masked content (34). If necessary, virtual mask 16 may be scaled to the appropriate size to substantially match the size of the images. In other embodiments, the images to be projected by projector 12 may be configured to remain within main image area 20, in which case virtual mask 16 may be used to help block light that is projected outside of main image area 20 because of, for example, misalignment between projector 12 and projection screen 14.

Figure 3C:
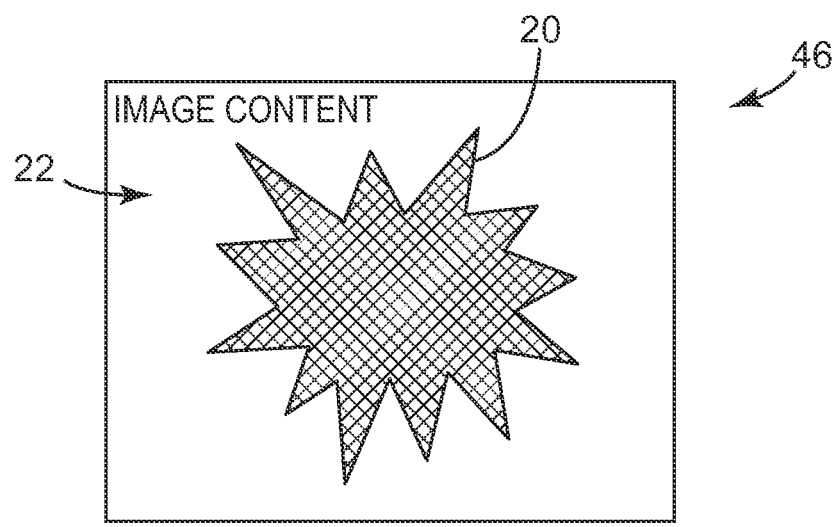
FIG. 3C is a schematic diagram of another embodiment of a virtual mask that may be created based on the virtual shape template shown in FIG. 3A.

Alternatively, main image area 20 and region 22 outside of main image area 20 may be reversed such that the "Image Content" is projected onto region 22, and any content projected into area 20 is substantially blocked from viewing by viewers by the virtual mask. An example of such virtual mask 46 is shown in FIG. 3C. Virtual mask 46 may be useful for projecting a static or animated border around a center of the projection area 18 (FIG. 1) of projector 12.

Projector 12 may project different types of images, such as static images or dynamic, i.e., video images. Virtual mask 16 may be incorporated with the projected images in different ways, depending on whether the images are static or dynamic, and, in some cases, depending on the program used to edit the images. For example, in the case of dynamic, video images, some video editing programs may permit mask 16 to be incorporated with the video images through the use of alpha channels. Examples of digital motion graphics and compositing software and/or other video editing programs that may be used to create dynamic, animated images include Adobe Flash and Adobe After Effects, available from Adobe Systems Incorporated of San Jose, Calif., Apple Final Cut Pro, available from Apple Computer, Inc. of Cupertino, Calif., and Microsoft PowerPoint, available from, available from Microsoft Corporation of Redmond, Wash. As another example, in some cases, virtual mask 16 may be incorporated as a top layer over static images and/or dynamic images. For example, using Microsoft PowerPoint, virtual mask 16 may be an image that is imported or pasted onto each PowerPoint slide.

Projector 12 projects the masked content onto screen 14, and because the content is confined to main image area 20 of virtual mask 16, the content is not projected onto region 19 of projection area 18 outside of projection screen 14. The masked content may be inputted into a computing device that is coupled to projector 12 and sends signals to projector 12 to cause projector 12 to project an image onto screen 14 (35). Alternatively, projector 12 may have its own processor that receives the inputted image files and controls projector 12 to project the images onto screen 14.

The user may configure projection screen 14 based on virtual shape template 43 (36). In one embodiment, virtual shape template 43 is scaled to a desired size of projection screen 14. In embodiments in which virtual shape template 43 is a vector graphics file, the scaling of the shape to the desired size of projection screen 14 is accomplished without losing the clarity of the outer boundaries of the shape or without degrading the resolution of the outer edges. Thus, a vector-based virtual shape template 43 may be scaled to any size without compromising the shape of projection screen 14 or the smoothness of the edges of projection screen 14.

Projection screen 14 may be cut from an optical film or other material by hand or with a computer-controlled cutting machine. Regardless of whether projection screen 14 is manually or automatically cut, it may be desirable for the outer perimeter of projection screen 14 to be substantially free of jagged edges in order to create projection screen 14 with substantially clean edges. Substantially clean edges may be more aesthetically pleasing than jagged edges. If projection screen 14 is cut by hand, the user may print a physical template of virtual shape template 43 in the desired size and use the physical template to cut screen 14 from the projection screen material.

If projection screen 14 is cut by a computer-controlled cutting machine, the cutting path for the machine may be based on a properly scaled virtual shape template 43. In one embodiment, the cutting machine is a computer numerically controlled (CNC) cutting machine employing a cutting tool to cut the projection screen film. The CNC cutting machine may be configured to move a cutting tool in two, three or more dimensions. As previously discussed, in some embodiments, virtual shape template 43 defines a cutting path for a computer-controlled cutting machine, such as by using a coordinates to indicate the linear path of cutting. In one type of CNC cutting machine, a controller, which may be provided by an external computing device or may be integral with the CNC cutting machine, generates signals indicative of the cutting path based on shape template 43. Based on the signals, the cutting tool of the cutting machine selectively cuts the projection screen material to produce projection screen 14 defining a customized shape. The cutting machine may cut screen 14 with a substantially continuous path in order to create a substantially clean edge.

After projection screen 14 is cut to the desired shape (36), projection screen 14 may be installed at the desired location. In some embodiments, projection screen 14 is configured to be applied directly to an application surface. In the case of a rear projection screen, the application surface may be any suitable substantially transparent surface as long as screen 14 is in a position capable of being viewed. The substantially transparent surface may comprise, for example, exterior or interior doors or windows. In some cases, substantially transparent surface may be somewhat opaque. For example, the surface may comprise a tinted, dirty or colored window, or it may comprise a window that has a wire pattern embedded in the glass. Alternatively, projection screen 14 may include a stand that allows projection screen 14 to be free-standing.

After projection screen 14 is installed, projector 12 may be positioned relative to screen 14 (40). Alternatively, if projector 12 is in a fixed location, projection screen 14 may be positioned relative to projector 12. Precise and accurate placement of projector 12 relative to screen 14 is an important aspect to correctly projecting an image onto screen 14 defining a customized shape. Due to the nature of the unique border of screen 14, there may be less of a margin for misalignment between projector 12 and screen 14. Factors that may be adjusted to align projector 12 and screen 14 include the extent of image zoom of projector 12, the relative vertical movement of projector 12 (e.g., adjusting a keystone that elevates projector 12), and skew settings of projector 12.

Figure 7:
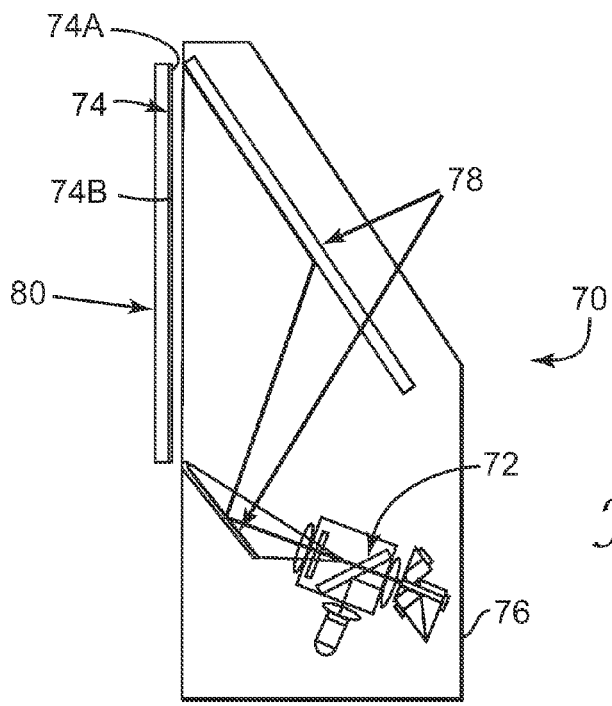
FIG. 7 is a schematic side view of an example of an optical system including a projection system in accordance with the present invention.
Figure 8:
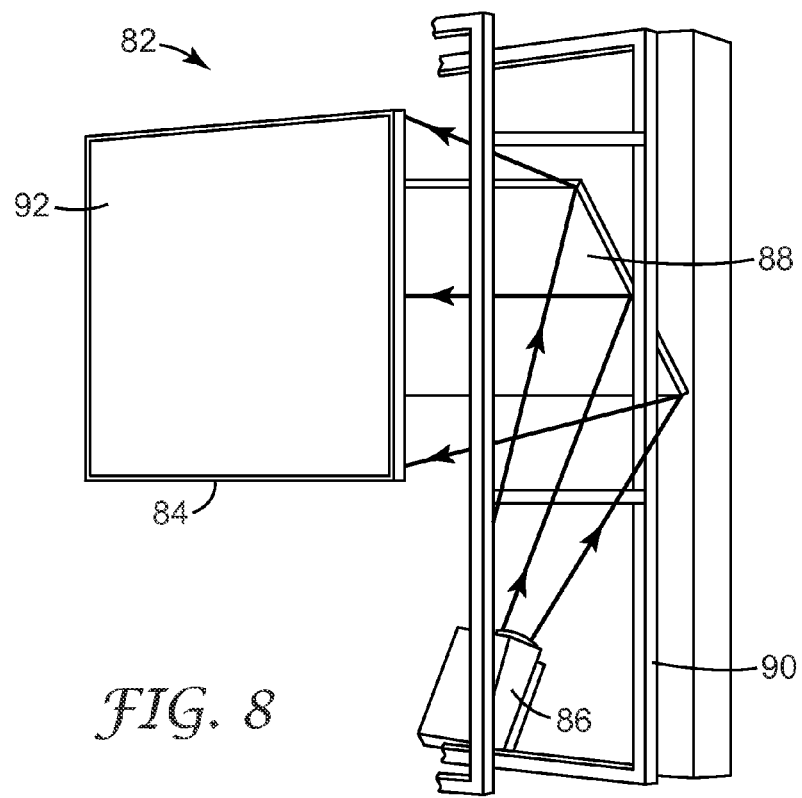
FIG. 8 is a schematic perspective view of another example of an optical system.

In some embodiments, projection screen 14 and projector 12 are coupled together, such as in a frame assembly. Accordingly, in those embodiments, projector 12 need not be positioned relative to screen 14 because such positioning is predetermined by the projector/projection screen assembly. Examples of frame assembly projection systems (or "optical systems" are shown in FIGS. 7 and 8 and described below.

After projector 12 is positioned relative to screen 14 such that the main image projected by projector 12 substantially aligns with screen 14 (40), projector 12 may project the content onto projection screen 14 (42). The "main image" includes images other than the light limiting content provided by mask 16 to block out portions of the projected image that are not projected on screen 14.

Figure 4:
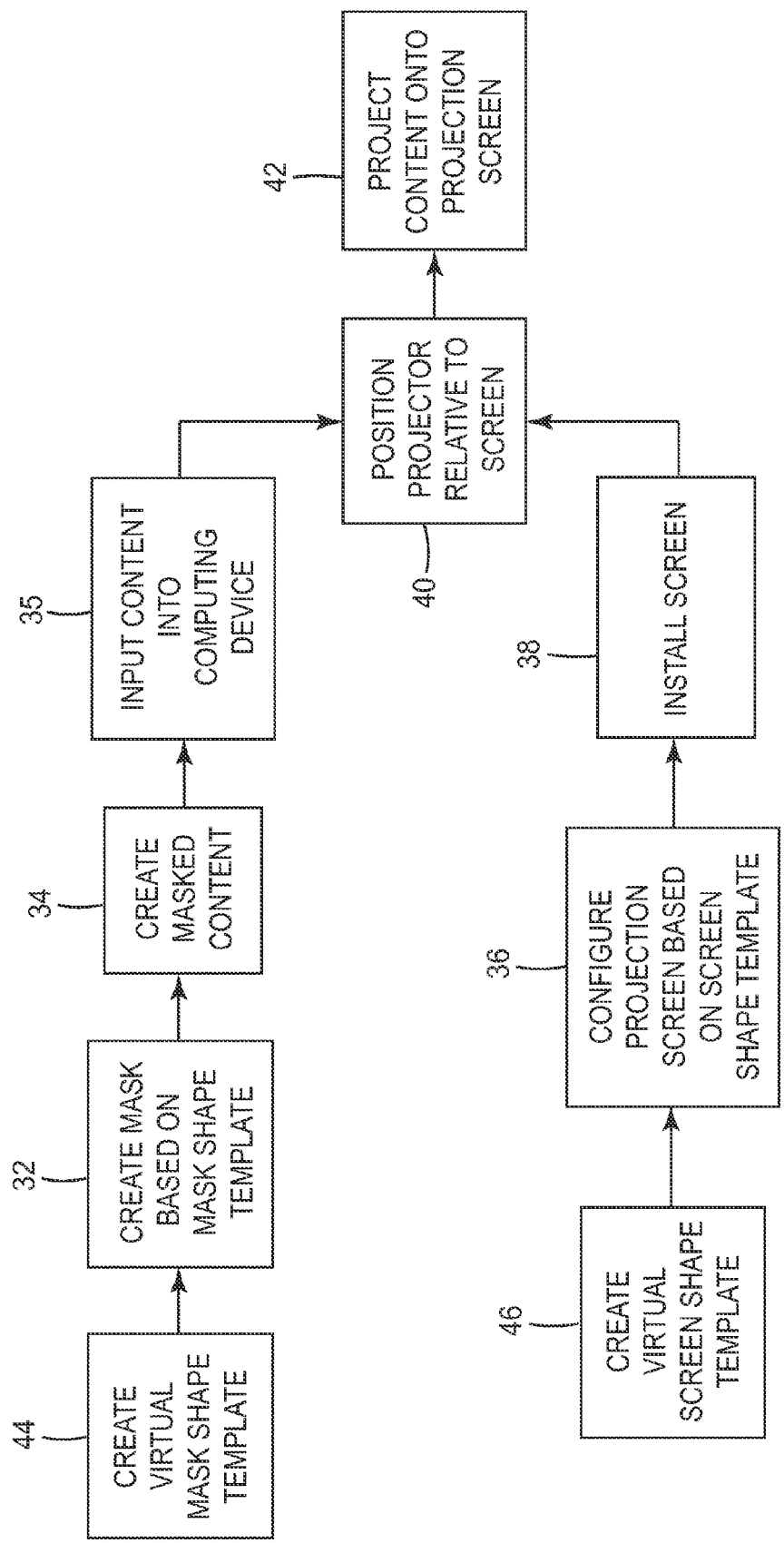
FIG. 4 is a flow diagram illustrating a technique for defining a shape of a virtual mask and a projection screen using two different virtual shape templates.

In the embodiment of the technique shown in FIG. 2, the same virtual shape template is used to create virtual mask 16 and projection screen 14. In other embodiments, different shape files defining substantially similar shapes may be used. An example of a technique employing two different shape files to create virtual mask 16 and projection screen 14 is shown in FIG. 4. FIG. 4 is a flow diagram illustrating a technique that is substantially similar to the technique shown in FIG. 2, except that the technique includes creating a virtual shape template for virtual mask 16 (48) and creating a virtual shape template for projection screen 14 (49), rather than creating a virtual shape template that is common to both projection screen 14 and virtual mask 16.

Figure 5:
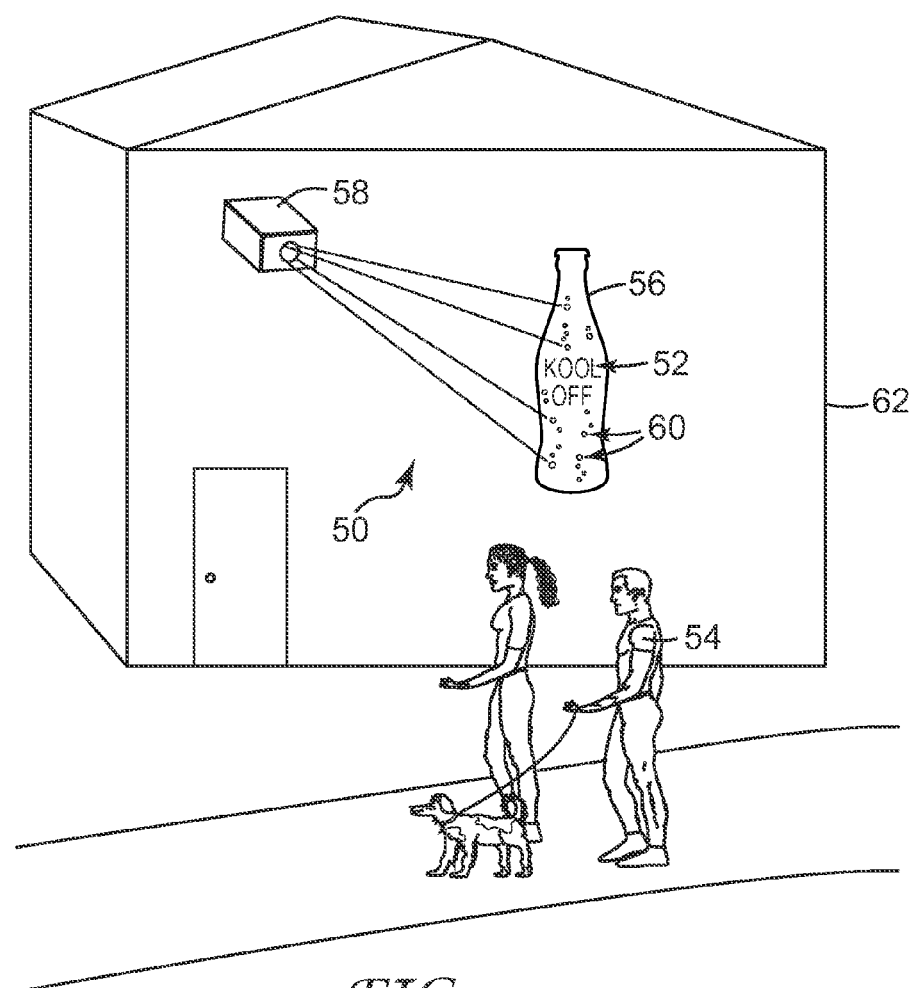
FIG. 5 is a schematic diagram illustrating an optical system for displaying information to a viewer.

FIG. 5 is a schematic diagram illustrating an optical system 50 for displaying information 52 to viewers 54. Viewers 54 may be, for example, an audience, spectators, pedestrians, potential customers, drivers, passengers, students, patrons or listeners. Optical system 50 includes projection screen 56 configured in a bottle shape and projector 58. Projector 58 presents image 52 to viewer 54 via screen 56. The image may be any suitable form of information such as textual data, video, still pictures or graphics. Information 52 may, for example, comprise a wide variety of information useful to communicate to a viewer such as a potential customer, such as information a product. In the embodiment shown in FIG. 5, information 52 comprises the name of a beverage, "Kool Off." In addition, projector 58 projects animated bubbles 60 on projection screen 56 with the aid of a virtual mask (not shown). The virtual mask helps block any animated bubbles 60 or other images that are projected outside of screen 56, and thus, limits the animated bubbles 60 to screen 56 and limits light from projector 58 from shining in the viewers' eyes.

Optical system 50 may be useful for displaying information 52 for various purposes, such as, but not limited to, providing a warning, entertainment, promoting sales, presenting advertisements, presenting educational information, presenting announcements, promotions, displaying instructional information, and presenting or otherwise communicating other types of information. For example, optical system 50 may be useful for displaying information in high traffic areas such as airports, train stations, highways, banks, shops, cafes, ports, malls, shopping centers, trade shows, sports centers, convention centers, entertainment complexes, pubs, roads, grocery stores, entertainment centers, restaurants, securities companies, bars, nightclubs, bistros, retail outlets, auto dealerships, markets, convenience stores, CD stores, entertainment pavilions, bike trails, travel agencies, banks, bookstores, hardware stores, warehouses, franchises, tourist attractions, and trading exchanges. Optical system 50, however, is also useful in many other situations, and is not limited to use in high traffic areas.

Projector 58 may be any suitable rear-projection device. A wide variety of projectors may be used with a screen in the invention, including LCD projectors, DLP projectors, D-ILA projectors, and plasma projectors. Other projectors may utilize surface-conduction electron-emitter display (SED) technology, organic light-emitted diode (OLED) technology, solid-state technology using lasers, and solid-state technology using light emitting diodes (LED).

Screen 56 is a substantially flexible projection screen that defines a viewing surface for presenting information. Screen 56 may be cut or otherwise formed to define certain shapes or sizes and define various shapes using any suitable technique, including the techniques described above with reference to FIG. 2, in which screen 56 is cut into the shape using a vector graphics file and a computer-controlled cutting machine. In the embodiment shown in FIG. 5, screen 56 is a rear projection screen and defines a rear surface for receiving light from projector 58, and a viewing surface opposite the rear surface. In other embodiments, screen 56 may be a front projection screen in which the viewing surface both receives light from projector 58 and presents the information to viewers 54.

In some cases, public information displays may be changed, or removed completely, at relatively frequent intervals. As a result, components of such displays may need to be removed from the display site and stored for later use, or discarded and replaced at a later time. Screen 56 is useful for storing in relatively limited storages spaces because screen 56 is substantially flexible, permitting screen 56 to be rolled up or otherwise manipulated into a smaller foot print. For example, as described above, in one embodiment, screen 56 may be rolled into a relatively tight cylindrical configuration, such as a roll having a diameter of eight inches or less, depending on the size of screen 56. In this way, screen 56 may be placed, for example, in a protective tube or another protective housing during storage and/or transportation. In addition, rolling screen 56 during storage may help limit damage to screen 56 during handling (e.g., during shipping of screen 56).

Screen 56 is coupled to a substantially transparent application surface 62. In the embodiment shown in FIG. 5, screen 56 may be placed on any substantially transparent surface as long as it is in a position capable of being viewed by the potential customer 54. The substantially transparent surface may comprise, for example, exterior or interior doors or windows. In addition, flexible screen 56 is substantially conformable. That is, flexible screen 56 may readily change shape to substantially conform to the shape/configuration of a substrate (e.g., an application surface, such as substantially transparent surface 62 shown in FIG. 1) with an uneven, irregular or slightly curved surface.

Screen 56 may be substantially permanently or removably attached to substantially transparent surface 62. If screen 56 is removably attached to application surface 62, screen 56 may be removed from surface 62 without substantially damaging surface 62 or resulting in excessive residue or adhesive transfer from screen 56 to surface 62. In contrast, a permanent adhesive substantially permanently adhere screen 56 to surface 62 and renders screen 56 very difficult to remove from surface 62 without substantially damaging surface 62 or leaving excessive residue or adhesive transfer on surface 62 after removal of screen 56. Removable attachment of screen 56 to surface 62 affords a temporary, secure attachment of screen 56 to transparent surface 62 while affording convenient, manual removal of the screen 56 from surface 62.

Screen 56 may be coupled to surface 62 via a removable adhesive that is disposed on the viewing surface of screen 56 (i.e., the surface of screen 56 facing viewers 54). The adhesive is designed to adhere screen 56 directly or indirectly to substantially transparent surface 62 (e.g. a window, wall, windshield, partition, table or door) so that viewers 54 may look through the window and see information 52 presented on screen 56 via projector 58. In addition, in some embodiments, the adhesive is an optical adhesive that allows a viewer to see through the adhesive without substantial degradation of the image quality or light transmission. Furthermore, in some embodiments, the adhesive may be a diffuse adhesive or a tinted adhesive.

Examples of removable adhesives are disclosed in U.S. Pat. Nos. 3,691,140, 4,166,152, 4,968,562, 4,994,322, 5,296,277, and 5,362,516 (the entire contents of which are herein incorporated by reference). In some embodiments, the removable adhesive is configured such that the necessary removal force to remove screen 56 from a glass window is about 20 grams to about 5.0 pounds force per lineal inch. For example, in one embodiment, the removal force for removing screen 56 from a glass window is about 0.5 to about 2.0 pounds force per lineal inch.

In embodiments in which screen 56 is removably attached to surface 62, screen 56 is particularly useful for providing information to potential customers temporarily or during a predetermined time period. For example, an automobile dealership may wish to temporarily display advertising during a short time period to promote a fleeting bargain and generate excitement with consumers. Alternatively, a new place of business may wish to attract attention to a grand opening sale. In another embodiment, a centrally managed business may desire to engage in a transient marketing program designed to temporarily promote a good or service. Screen 56 may also be useful for promoting a new product, such as a new beverage product. As another example, screen 56 is useful for displaying information associated with impermanent events (as opposed to permanent events), special events (e.g. a farewell tour of a popular rock band), highly publicized marketing or promotional campaigns, high profile proceedings, advertising intended to briefly hype goods or services, fleeting sales or specials, and other transitory events.

In some embodiments, the removable adhesive is also reusable. A reusable adhesive affords a temporary, secure attachment of the screen 56 to transparent surface 62 while affording convenient removal of screen 56 from transparent surface 62 without substantially damaging the transparent surface 62 or adjacent surfaces, or exhibiting excessive adhesive transfer from screen 62 to transparent surface 62. In addition, the reusable adhesive affords subsequent reuse of screen 56 (e.g., on another transparent surface). As yet another advantage, a reusable adhesive may allow a position of screen 56 to be adjusted on transparent surface 62. For example, if a user couples screen 56 to transparent surface 62, but subsequently decides to adjust the initial position of screen 56, the reusable/repositionable adhesive may allow the user to disengage screen 56 from surface 62 and reattach screen 56 to surface 62 in another position until a screen 56 is in a desired position.

The reusable adhesive may be washable. A "washable" adhesive is an adhesive that can be treated by an appropriate cleaning solution (such as water or soap and water) to remove materials detrimental to an adhesive, thereby at least partially refreshing the adhesion of a used surface. After a number of uses, the adhesive may become dirty or otherwise detackified. Washing of washable adhesives removes materials that detract from the adhesion performance of the surface, and refreshes the surface for additional uses of screen 14.

In some embodiments, the adhesive used to couple screen 56 to surface 62 is a repositionable adhesive, which may also be a removable and/or reusable adhesive in some embodiments. A repositionable adhesive permits a user to move screen 56 relative to application surface 62 without entirely removing screen 56 therefrom. Foe example, a user may initially engage screen 56 with surface 62 and move screen 56, such as by "sliding" screen 56 along transparent surface 62, from the initial position to another position without removing screen 56 from transparent surface 62. In some embodiments, when screen 56 is initially placed on surface 62, screen 56 may not be adhered to surface 62, and a user may need to manually hold screen 56 against surface 62. After screen 56 is in the desired position, user may apply pressure to screen 56 to engage the adhesive with surface 62 and secure screen 56 in place relative to surface 62. In contrast to a strictly permanent or removable adhesive, a repositionable adhesive allows a user to reposition screen 56 relative to surface 62 without removing screen 56 from surface 62.

Screen 56 may include different adhesive layer configurations. In one embodiment, the adhesive preferably covers substantially all of the viewing surface side of screen 56 to provide a substantially uniform optical coupling of screen 56 to transparent surface 62. In such instances, it may be useful to use an adhesive with special features, such as a microreplicated adhesive, to address the problem of entrapped air between the screen and substrate. Suitable adhesives are disclosed in U.S. Pat. No. 6,197,397 and PCT Publication No. WO 00/56556 (the entire contents of both of which are incorporated by reference).

Examples of microreplicated adhesives that may be repositionable and include special features for bleeding entrapped air, and methods of making the same are further described in commonly-assigned U.S. Pat. No. 6,197,397, entitled, "ADHESIVES HAVING A MICROREPLICATED TOPOGRAPHY AND METHODS OF MAKING AND USING SAME" and issued on Mar. 6, 2001, U.S. Pat. No. 6,524,679, entitled, "METHOD OF ENHANCING COATING SPEED," and issued on Feb. 25, 2003, U.S. Pat. No. 6,803,072, entitled, "METHOD OF ENHANCING COATING SPEED," and issued on Oct. 12, 2004, U.S. Pat. No. 5,141,790, entitled, "REPOSITIONABLE PRESSURE-SENSITIVE ADHESIVE TAPE," and issued on Aug. 25, 1992, U.S. Pat. No. 5,296,277, entitled, "POSITIONABLE AND REPOSITIOANBLE ADHESIVE ARTICLES," and issued on Mar. 22, 1994, U.S. Pat. No. 5,362,516, entitled, "METHOD OF PREPARING AN ADHESIVE ARTICLE," and issued on Nov. 8, 1994, U.S. Pat. No. 5,795,636, entitled, "POSITIONABLE AND REPOSITIONABLE ADHESIVE ARTICLE," and issued on Aug. 18, 1998, U.S. Pat. No. 6,123,890, entitled, "METHOD FOR MAKING PRESSURE-SENSITIVE ADHESIVE ARTICLES HAVING MICROSTRUCTURED SURFACES," and issued on Sep. 26, 2000, U.S. Pat. No. 6,015,606, entitled, "ADHESIVE-COATED FILM," and issued on Jan. 18, 2000, and U.S. Pat. No. 6,524,675, entitled, "ADHESIVE-BACK ARTICLES," and issued on Feb. 25, 2003." Further examples of microreplicated adhesives are described in PCT Publication No. WO 00/22059 (Hidetoshi), and PCT Publication No. WO 00/69985 (Mikami). The entire content of each of the foregoing U.S. patents and PCT publications are incorporated herein by reference.

In another embodiment, only portions of the viewing surface of screen 56 are coated with an adhesive. The adhesive may be arranged in a plurality of stripes, triangles, polymeric patterns or another pattern. While the adhesive is preferably an optical adhesive, it should be noted that non-optical adhesives may be used, particularly when the adhesive does not cover the entire surface of the screen. For example, with large screens where small imperfections in the screen may not be as apparent to a viewer, a few imperfections resulting from a non-optical adhesive may be more easily tolerated. An opaque adhesive may even be used as a border to help expedite installation of screen 56 as described with reference to FIG. 6.

Adhesion of screen 56 to display surface 62 may be aided by a fluid, such as water, between screen 56 and surface 62. For example, water may be applied to the application surface prior to placing screen 56 on surface 62. The fluid may also decrease the coefficient of friction between screen 56 and application surface 62, which may help the user slide screen 56 relative to surface 62 in embodiments in which a repositionable adhesive is used to attach screen 56 to surface 62. Upon placing screen 56 at the desired position on the application surface, the user may bleed the fluid out from between screen 56 and application surface 62, such as with the aid of a microstructured topography (e.g., shown in FIG. 9) and/or a roller that applies a uniform pressure to screen 56.

Figure 6:
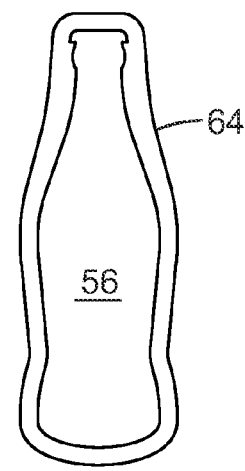
FIG. 6 is a schematic plan view of the projection screen of the optical system of FIG. 5 and a border around the projection screen.

FIG. 6 is schematic plan view of projection screen 56 of optical system 50 of FIG. 5 and border 64 positioned around screen 56. Border 64 may be applied around screen 56 using any suitable technique and is not directly connected to projection screen 56 in all embodiments. In some embodiments, border 64 is printed onto projection screen 56, while in other embodiments, border 64 comprises a material, such as a tape, that is applied around projection screen 56. The tape may be applied after projection screen 56 is affixed to surface 62 (FIG. 5), such as transparent surface 62 of FIG. 5. Border 64 defines an outer frame around projection screen 56, which may help draw a visible distinction between screen 56 and display surface 62 on which screen 56 is placed. Border 64 also provides leeway for projector 58 (FIG. 5) to be misaligned with projection screen 56. In particular, border 64 minimizes the possibility that a slightly misaligned projector 58 will shine directly into the eyes of viewer 54 (FIG. 5). Border 64 may be a single color or may include graphics, characters, advertising or other printing. While border 64 is directly adjacent to screen 56 in the embodiment shown in FIG. 6, in other embodiments, border 64 may be offset from screen 56.

FIG. 7 is a schematic side view of an example of optical system 70 that includes projection screen 74 defining a customized shape and projector 72 configured to project content onto projection screen 74 with the aid of a virtual mask (not shown in FIG. 7). Optical system 70 also includes frame 76 and mirrors 78. In other embodiments, optical system 70 does not include mirror 78, and may be, for example, a single lens projector. During operation of optical system 70, projector 72 projects an image toward screen 74. Screen includes rear surface 74A, which receives light originating from projector 72, and a front surface 74B substantially opposite rear surface 74A. Front surface 74B is the "viewing" side of screen 74, and an image projected by projector 72 may be viewed from front surface 74B of screen 74. A viewer may look at window 80 and see the image provided by optical system 70.

In one embodiment, screen 74 comprises a rear projection screen such as a beaded screen described in U.S. Pat. No. 6,870,670. Other screens are also contemplated for use with the present invention, including diffusion screens. For example, optical system 70 may include a Fresnel lens and/or a lenticular lens or sheet as described in or constructed in accordance with U.S. Pat. Nos. 3,712,707, 3,872,032, 4,379, 617, 4,418,986, 4,468,092, 4,509,823, 4,576,850, and 5,183, 597 (the entire contents of which are herein incorporated by reference).

Projector 72 and mirrors 78 may be pre-installed in frame 76, such as at a remote, centralized location such as a warehouse or factory. In this embodiment, to install optical system 70 at a place of business, a user may couple screen 74 to window 80 and then position frame 76 proximate to window 80. In this way, a preassembled projector 72 and mirror 78 assembly may simplify installation and removal of optical system 80.

FIG. 8 is a schematic perspective view of another example of optical system 82 that includes screen 84 cut into a customized shape and projector 86 configured to project an image onto screen 84 with the aid of a virtual mask (not shown in FIG. 8). Optical system 82 further includes mirror 88 and an adjustable frame and stand system 90. Screen 84 is adapted to be coupled to window 92. Adjustable frame and stand system 90 accommodates the use of different projectors 86 in optical system 82. For example, an on-axis projector may be used with a first promotional campaign with a first screen 84 defining a first shape. Thereafter, the on-axis projector may be replaced with an off-axis projector for a second promotional campaign having different video requirements. If desired, screen 84 may be replaced by another screen defining a different shape for the second promotion campaign.

Figure 9:
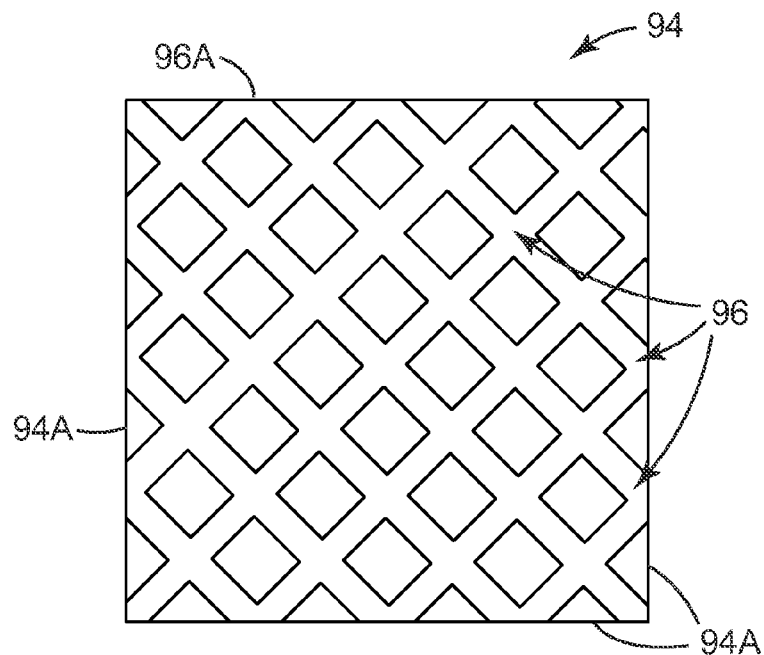
FIG. 9 is a plan view of a microstructured adhesive of a projection screen, where the adhesive defines channels to aid fluid bleed from between the projection screen and an application surface.

FIG. 9 illustrates a plan view of microreplicated adhesive layer 94 that may be used to couple a substantially flexible projection screen to application surface 62 (FIG. 5). Although screen 56 is referred to throughout the description of adhesive layer 94, in other embodiments, screen 14 (FIG. 1), screen 74 (FIG. 7), screen 92 (FIG. 8) or other projection screens defining a customized shape and incorporated into a projection system including a projector with a mask to limit the projection of content to the shape of the projection screen may also include microreplicated adhesive layer 94.

Microreplicated adhesive 94, which may also be referred to as a microstructured adhesive, exhibits certain structural characteristics that reduce and, in some cases, eliminate the subsequent formation of air pockets in screen 56 after screen 56 is coupled to application surface 62. Adhesion of screen 56 to application surface 62 or another substrate may result in entrapped air or another fluid between screen 56 and application surface 62. In embodiments in which adhesion of screen 56 to application surface 62 is aided via a liquid, e.g., water, or another fluid placed between screen 56 and application surface 62, the liquid may become entrapped between screen 56 and application surface 62. Microreplicated adhesive 94, however, defines a plurality of channels 96 for the air, liquid or other fluid to traverse in order to exit the space between screen 56 and application surface 62.

Channels 96 define a topography of adhesive 94 that encourages fluid bleed. Channels 96 may be continuous open pathways or grooves that extend into adhesive 94 from the exposed surface. Channels 96 either terminate at the peripheral portion 94A of adhesive layer 94 or communicate with other channels that terminate at peripheral portion 94A of adhesive layer 94. A user may "bleed" the air trapped between adhesive 94 and an application surface or another substrate via the microreplicated adhesive channels. In this way, microreplicated adhesive 94 provides a reduction or elimination of the formation of air pockets due to out gassing.

In other embodiments, microreplicated adhesive 94 may not define an ordered array of channels, as shown in FIG. 9. For example, a microreplicated adhesive may define a chaos pattern, which is a substantially random pattern of channels that terminate at peripheral portion 94A of adhesive 94 or communicate with other channels that terminate at peripheral portion 94A. Other microreplicated adhesives having regular or irregular patterns may be used in other embodiments.

The use of a release liner or backing for adhesive layer 94 is one method suitable for defining the microreplicated adhesive 94. The release liner or backing may be embossed with the desired microreplicated pattern, and then the adhesive may be subsequently applied to the linear via any suitable technique, such as casting, extruding, coating, spraying, screen-printing and laminating. The topography of the embossing tool(s) typically has the same topography as the microreplicated adhesive, with the liner having an inverse topography in order to replicate the image of the tool(s) on the adhesive surface. The release liner may be made of various materials such as but not limited to plastics such as polyethylene, polypropylene, polyesters, cellulose acetate, polyvinylchloride, and polyvinylidene fluoride, as well as paper or other substrates coated or laminated with such plastics. The embossable coated papers or thermoplastic films may be siliconized or otherwise treated to impart improved release characteristics. The thickness of the release liner can vary widely according to the desired effect. Furthermore, it is possible to afford structures to the release liner by using various techniques, such as those disclosed in U.S. Pat. No. 5,650,215, entitled, "PRESSURE-SENSITIVE ADHESIVES HAVING MICROSTRUCTURED SURFACES" and issued on Jun. 22, 1997, which is incorporated herein by reference in its entirety.

In other techniques for forming microreplicated adhesive 94, the microstructured surface may be embossed onto an adhesive layer. The microreplicated features may be imparted by embossing the adhesive directly through utilization of molding tools. Such methods and practices are fully disclosed in U.S. Pat. No. 5,650,215. Alternatively an inverse embossing tool may be used to directly impart the microstructures onto an adhesive surface. Microreplicated adhesive 94 may be manufactured by other means as well.

Examples of microreplicated adhesives and methods of making the same are further described in commonly-assigned U.S. Pat. No. 6,197,397, entitled, "ADHESIVES HAVING A MICROREPLICATED TOPOGRAPHY AND METHODS OF MAKING AND USING SAME" and issued on Mar. 6, 2001, PCT Publication No. WO 00/22059 (Hidetoshi), and PCT Publication No. WO 00/69985 (Mikami). The entire content of each of the U.S. Pat. No. 6,197,397 and PCT Publication Nos. WO 00/22059 and WO 00/69985 are incorporated herein by reference.

FIG. 10 is a schematic side view of projection screen 100 that may be incorporated into projection system 10 (FIG. 1). A viewing eye 102 is schematically shown in FIG. 10 in order to provide a reference point for identifying a rear side 100A of screen 100, which faces away from viewing eye 102, and a front, viewing side 100B of screen 100, which faces viewing eye 102. Front side 100B is on an opposite side of screen 100 from the rear side 100A (also referred to as a "back side"). Screen 100 may be any one of screens 14 (FIG. 1), 56 (FIG. 5), 80 (FIG. 7) or 92 (FIG. 8).

Screen 100 includes a plurality of refractive elements 100 (e.g., glass beads), light absorbing layer 106, light transmitting substrate 108, removable adhesive 110, and liner 112. In one embodiment, refractive elements 104 are situated in substantially predetermined positions. However, manufacturing and cost limitations may limit the precision of the placement of refractive elements 104. For example, refractive elements 104 may be placed in an array, a closely or loosely packed arrangement.

Refractive elements 104 may be constructed from glass or polymeric materials. Suitable examples include glass or a transparent plastic material. Projections screens including refractive beads and construction of such screens may comprise the teachings disclosed in commonly assigned patent applications PCT WO 99/50710 and PCT WO 98/45753, and U.S. Pat. No. 6,466,368, issued Oct. 15, 2002, and entitled "REAR PROJECTION SYSTEM WITH REDUCED SPECKLE," and U.S. Pat. No. 6,535,333, issued Mar. 18, 2003, entitled "OPTICAL SYSTEM WITH REDUCED COLOR SHIFT", U.S. Pat. No. 6,631,030, issued Oct. 7, 2003, and entitled "PROJECTION SCREENS AND METHODS FOR MAKING SUCH PROJECTION SCREENS," and U.S. Pat. No. 6,204,971, issued Mar. 20, 2001 and entitled "GLASS MICROSPHERES FOR USE IN FILMS AND PROJECTION SCREEN DISPLAYS AND METHODS" (the entire contents of each of which are herein incorporated by reference).

In one embodiment, refracting elements 104 are transparent, substantially spherical, refracting beads seated in an absorptive, high optical density transparent polymer matrix. The beads may be in intimate contact with a transparent binder material. The beads may have a refractive index between about 1.2 and 1.9. In some embodiments, the spherical beads have an average diameter of greater than about 20 micrometers (μm) and less than about 400 μm. For example, the average diameter may be between about 40 μm and about 90 μm. As another example, the average diameter of the refractive beads may be is a range of about 50 μm and about 80 μm. In one embodiment, the average diameter of each spherical refractive bead is about 65 μm.

Screen 100 including refractive beads (i.e., a "beaded screen") affords a relatively good contrast and a viewing angle that allow a bright, sharp picture to be viewed at wide angles while minimizing any losses in image quality due to washout from sunlight or room lighting. Beaded screens may be constructed to provide substantially symmetric horizontal and vertical viewing angle and gain characteristics. This may be particularly useful for large screens used in multilevel locations (such as shopping malls) where a person located on a level above or below the screen may wish to view the screen. Also, beaded screens may be constructed to be flexible so that they can be easily mounted to any rigid, transparent surface minimizing surface reflection losses that might be present with a conventional rigid rear projection screen.

Projection screens may be susceptible to loss of image contrast due to ambient light incident on the screen. Such ambient light effects can be suppressed by various means, including the use of refractive elements surrounded by an opaque, typically black, matrix of material. In screens of this type, the viewing angle can be varied by varying the refractive index of the refractive elements of the screen.

As used herein, the viewing angle means the angle at which gain is reduced by 50% of the peak value. To determine viewing angle, screen gain is tested. Gain is a measure of screen brightness and a function of viewing angle. It is normalized with respect to a Lambertian diffuser. To measure gain, a white light source illuminates a white reflectance standard. Its luminance is measured with a luminance meter at near normal incidence ($L_R$). A screen is placed in front of the light source and the luminance is measured (on the opposite side of the sample from the source) at near normal incidence ($L_S$). The peak gain is defined as the ratio of $L_S/L_R$. After the on-axis gain measurement, the screen then stepped through a range of angles, a luminance reading taken at each position. $L_S$-$\Theta$/$L_R$ (Gain) is then plotted as a function of angle. The viewing angle is defined as the angle at which the gain falls to one-half its peak value.

When beaded rear projection screens are used for displays, it has been found that in some situations, a wider viewing angle is desired, while in other situations, a narrower viewing angle may be preferred. Lower refractive indices for the beads tend to narrow the viewing angle, but provide a brighter image to viewers located within the area defined by the maximum viewing angle. For this reason, it is useful to be able to provide a variety of different screens for different situations. Use of different beads for different screens affords this flexibility in screen design.

In one embodiment, light absorbing layer 106 may be coated on or otherwise coupled to light transmitting substrate 108. In another embodiment, light transmitting substrate 108 may be applied onto light absorbing layer 106. Light absorbing layer 106 helps controls ambient light rejection for an optical system. As a result of light absorbing layer 106, screen 100 supplies excellent contrast characteristics, even in relatively high ambient lighting conditions, as compared to screens that do not include a light absorbing layer 106. The contrast characteristics of screen may be described in terms of ambient light contrast ratio (ALCR), which is a ratio of the brightness of a white image to a black image and depends on the ability of a screen to absorb the ambient light. A testing assembly for measuring ALCR is described in commonly-assigned U.S. Pat. No. 6,870,670, entitled, "SCREENS AND METHODS FOR DISPLAYING INFORMATION," which issued on Mar. 22, 2005, the entire content of which is incorporated herein by reference.

In embodiments in which refractive elements 104 are glass beads, the glass beads help attribute a relatively high level of contrast performance in high ambient light conditions, i.e., a relatively high ALCR. In one embodiment, refractive elements 104, light absorbing layer 106, and light transmitting layer 108 are defined by an XRVS Beaded Screen, which is available from 3M Company of St. Paul, Minn., and exhibit an ALCR in a range of greater than about 25 to about 75 for ambient light of about 500 lux.

Light absorbing layer 106 may be opaque or substantially opaque. In embodiments, light absorbing layer 106 includes one or more of a powder coating of carbon black, a black dye, an opaque particle, an organic or inorganic pigment or particle, or such a particle dispersed in a binder material. The particles that define light absorbing layer 106 may be of a wide variety and shapes. For example, the material may be dispersed in a liquid or solid binder system. In one embodiment, light absorbing layer 106 comprises a clear binder having black particles dispersed throughout the clear binder. The binder may comprise, for example, an acrylate or other UV curable polymer. Light absorbing layer 106 may be applied by a conventional technique such as a coating process or powder coating.

Light transmitting substrate 108 is substantially flexible to help render screen 100 substantially flexible. Light transmitting substrate 108 is also substantially transparent or translucent. For example, a substantially flexible and substantially transparent substrate 108 may comprise suitable light transmitting materials such as polyvinyl chloride, acrylic, polycarbonate or combinations of such materials. Light transmitting surface 108 may include an optional matte anti-glare finish, such as a finish achieved by embossing.

Removable adhesive 110 couples screen 100 to an application surface, such as transparent surface 62 of FIG. 5. Removable adhesive 110 permits screen 100 to be removed from an application surface without substantially damaging the application surface or leaving undue adhesive residue behind on the application surface. In some embodiments, removable adhesive 110 is also a repositionable adhesive, which allows screen 100 to be moved relative to the application surface without completely removing screen 100 from the application surface. For example, screen 100 may be slidable relative to the application surface prior to applying pressure to adhesive layer 110 (i.e., by applying pressure to screen) to substantially secure screen 100 to the application surface.

Removable adhesive 110 may be an optical adhesive, such as the ones described PCT WO 97/01610 (the entire contents of which are herein incorporated by reference). In some embodiments, removable adhesive 110 may be reusable or repositionable. Other examples of suitable adhesives 110 include strong, tacky adhesives such as acrylic adhesives available from 3M Company of St. Paul, Minn. and Ashland Chemical Company of Columbus, Ohio (such as Aroset branded acrylics), and those constructions disclosed in U.S. Pat. No. 5,196,266 and PCT Patent Publication WO94/21742. Nonlimiting examples of other pressure sensitive adhesives 110 can generally be found in Satas, Ed., *Handbook of Pressure Sensitive Adhesives*, $2^{nd}$ Ed. (Von Reinhold Nostrand 1989). Of these adhesives, desirable adhesives include solvent-based acrylic and rubber adhesives, water-based acrylic adhesives, hot melt adhesives, microsphere-based adhesives, and silicone-based adhesives, regardless of their method of preparation.

Other nonlimiting examples of suitable adhesives 110 include acrylic adhesives from 3M Company and Ashland Chemical Co. and a nontacky adhesive, such as a terpolymer of acrylonitrile, butadiene, and isoprene, or similar copolymer of acrylonitrile and either butadiene or isoprene, commercially available under the brand Nipol adhesives from Zeon Chemical Co., Louisville, Ky. and those adhesives disclosed in EPO Patent Publication EP 0 736 585 (Kreckel et al.). Suitable acrylic adhesives having permanently low tack include microsphere-based adhesives disclosed in U.S. Pat.

No. 5,141,790 (Calhoun et al.); U.S. Pat. No. 5,296,277 (Wilson et al.); U.S. Pat. No. 5,362,516 (Wilson et al.) and EPO Patent Publication EP 0 570 515 B1 (Steelman et al.), which are each incorporated herein by reference in their entireties.

Coating weights of adhesive 110 can range from about 10 micrometers (μm) to about 300 μm, such as about 20 μm to about 250 μm. Percent solids of such adhesives in the formulations to be applied on layer range from about 5% to about 100%, such as about 20% to about 100%. Adhesive 110 may be applied using a variety of techniques known to those skilled in the art such as casting, extruding, coating, spraying, screen-printing and laminating.

In some embodiments, the refractive index of adhesive 110 is between about 1.40 and 1.9, such as between 1.4 and 1.55. The index of refraction of adhesive 110 may be similar to the index of refraction of the substrate 108 so that a minimum amount of scattering occurs. Scattering may reduce the brightness or other optical properties of screen 100. In one embodiment, the difference in the indexes of refraction of substrate 108 and screen 110 is less than about 0.15, such as less than about 0.1. Alternatively, other factors may be varied to achieve the desired effect.

Screen 100 optionally includes liner 112 that is designed to be manually removed from screen 100 just prior to installation of screen 100 on a window or another application surface. Liner 112 protects the viewing side 100B of screen 100 from damage, and helps prevent adhesive 110 from becoming contaminated prior to use of screen 100.

Screen 100 may optionally be a disposable screen. For example, screens including refractive elements 104 are typically much less costly than a holographic screen. As a result, it may be convenient for a user to simply dispose of screen 100 after use. Another advantage of a beaded screen is that a flexible beaded screen may be conveniently tiled together to create a large format screen (e.g. greater than 100 inches in diagonal) without encountering the difficulties associated with attempting to tile together large area rigid screens.

Other projection screens may be incorporated into a projection system of the present invention. For example, other projection screens described in commonly-assigned U.S. Pat. No. 6,870,670, entitled, "SCREENS AND METHODS FOR DISPLAYING INFORMATION," which was previously incorporated by reference, may be used in other embodiments.

The projection systems described herein are useful for many different applications. Examples of methods of providing information to a potential customer according are described in U.S. Pat. No. 6,870,670, entitled, "SCREENS AND METHODS FOR DISPLAYING INFORMATION." Also described in U.S. Pat. No. 6,870,670 are various networks that may be utilized to display information via a projection screen. Those networks may also utilize a projection system including a projection system described herein.

Various embodiments of the invention have been described. These and other embodiments are within the scope of the following claims.

The invention claimed is:

1. A system comprising:
    a projection area having a shape defined by surrounding graphics;
    a projector configured to project an image onto the projection area;
    a virtual mask superimposed on the image, the virtual mask comprising a main image area defining the shape; and,
    wherein the virtual mask substantially blocks portions of the image outside of the main image area.

2. The system of claim 1, wherein the graphics comprise a border.

3. The system of claim 1, wherein the graphics are printed graphics.

4. The system of claim 1, wherein the projection area and the surrounding graphics comprise a display surface.

5. The system of claim 1, wherein the projection area is on the same surface as the surrounding features.

6. The system of claim 1, wherein the virtual mask comprises:
    a border substantially corresponding to the shape of the projection area;
    a main image area comprising an outer perimeter substantially corresponding to the shape of the projection area; and,
    a region between the border and the outer perimeter, wherein the region comprises light limiting content.

7. The system of claim 1, wherein the projection area comprises a wall.

8. The system of claim 1, wherein the projection area is a substantially non-planar substrate.

* * * * *